Figure 1:
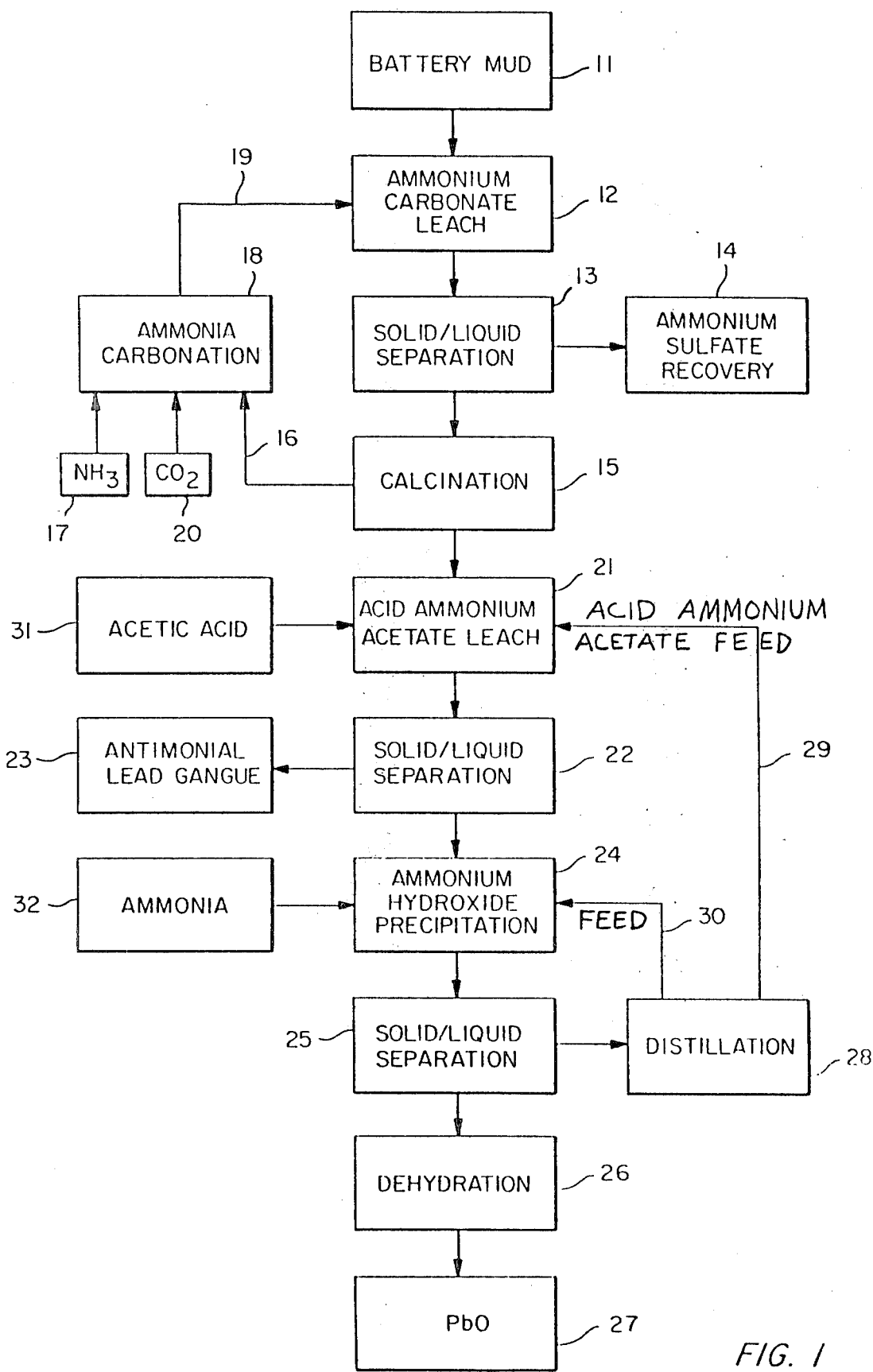

United States Patent [19]

Striffler, Jr. et al.

[11] 4,220,628
[45] Sep. 2, 1980

[54] PRODUCTION OF LEAD MONOXIDE FROM LEAD SULFATE WITH ACIDIC AMMONIUM ACETATE

[75] Inventors: Eugene Striffler, Jr., East Windsor; Michael A. Kolakowski, Milltown, both of N.J.

[73] Assignee: N L Industries, Inc., New York, N.Y.

[21] Appl. No.: 950,075

[22] Filed: Oct. 10, 1978

[51] Int. Cl.² ............................................ C01G 21/02
[52] U.S. Cl. ...................................... 423/92; 423/619
[58] Field of Search .................... 423/92, 619, 435; 260/436

[56] References Cited

U.S. PATENT DOCUMENTS

| 509,057 | 11/1893 | Waller | 423/92 |
|---|---|---|---|
| 3,194,633 | 7/1965 | Noss et al. | 423/619 |
| 3,230,043 | 1/1966 | Voss et al. | 423/619 |
| 3,497,382 | 2/1970 | Kwestroo et al. | 423/619 |
| 4,118,219 | 10/1978 | Elmore et al. | 423/92 |

Primary Examiner—Wayne A. Langel

[57] ABSTRACT

An efficient and inexpensive method for producing lead monoxide from impure lead sulfate bearing materials such as recycled battery mud is provided comprising:

(a) reacting said material with an ammonium carbonate solution to convert lead sulfate to lead carbonate;

(b) decomposing the lead carbonate to produce impure lead monoxide;

(c) reacting said impure lead monoxide with an acidic ammonium acetate solution to form a lead acetate solution;

(d) reacting ammonium hydroxide with the lead acetate solution to form lead hydroxide; and (e) dehydrating the lead hydroxide to produce lead monoxide.

13 Claims, 1 Drawing Figure

PRODUCTION OF LEAD MONOXIDE FROM LEAD SULFATE WITH ACIDIC AMMONIUM ACETATE

This invention is concerned with a process for preparing lead monoxide from impure lead sulfate bearing materials, particularly impure lead sulfate bearing materials such as recycled battery mud.

In the past, lead oxide has been produced by the oxidation of lead metal in a Barton Pot. The greatest single expense of the total manufacturing cost of producing lead oxide is the cost of the lead metal. Such lead metal may be obtained as secondary lead by reducing reclaimed lead compounds such as lead sulfate, lead oxides and lead alloys from used battery plates. There is substantial need for a process of preparing pure lead oxide from an inexpensive lead sulfate bearing material such as battery mud short of reducing lead compounds therein and oxidizing the so-formed lead metal.

The prior art has described various processes for treating impure lead bearing materials to produce useful lead compounds. In U.S. Pat. No. 2,328,089 to J. J. Mulligan for example, describes a process for recovering soluble lead salts from raw materials such as insoluble lead compounds and impure lead bearing materials (lead sulfate, lead oxide, lead peroxide, spent litharge, old battery lead plates and lead battery mud or sediment). The soluble lead salts are suitable for the manufacture of lead compounds, such as lead arsenates, chromates, molybdates, tungstates and acetates.

The aforementioned prior art process comprises first adding an aqueous solution of an alkali metal or ammonium carbonate or hydroxide to the raw material to convert the lead compound therein to an insoluble lead compound. The insoluble residue from this addition is next treated with formic acid or acetic acid wherein the acetic acid preferably contains a reducing agent for lead peroxide contained in the residue, e.g. formic acid, nitrite salts, hydrogen peroxide and hydrochloric acid. This treatment converts the insoluble lead compound to soluble acetate and formate salts which in turn, when combined with appropriate reagents, forms lead arsenate, lead chromate, lead molybdate and other lead compounds.

A method for converting a lead acetate solution to pure red lead monoxide is described in U.S. Pat. No. 3,450,496 to W. Kwestroo and P. H. G. M. Vromons, wherein pure lead acetate is combined with an aqueous ammonia solution under silicon-free conditions to form a precipitate. The precipitate is then heated to obtain the lead monoxide. Aspects of the above red lead monoxide process are also described in *Journal of Inorganic and Nuclear Chemistry*, Vol. 27, No. 9, pp 1951 to 1954 (September, 1965) by W. Kwestroo and A. Huizing and Vol. 29, pp 39 to 44 (1967) by the patentees of U.S. Pat. No. 3,450,496.

The present invention provides an unexpected hydrometallurgical process for producing substantially pure lead monoxide from inexpensive lead sulfate bearing materials such as battery mud which eliminates the need for reducing the total mass of such lead bearing materials and which permits continuous production of pure lead monoxide at greatly reduced expense.

The process of this invention employs a lead bearing material, particularly a lead sulfate bearing material, such as battery mud which may also contain small amounts of lead oxides and other impurities.

An unexpected process for preparing lead oxide from lead bearing material has been discovered which comprises:

(a) reacting said material with an ammonium carbonate solution to convert lead sulfate to lead carbonate;

(b) decomposing the lead carbonte to produce impure lead monoxide;

(c) reacting said impure lead monoxide with an acidic ammonium acetate solution to form a lead acetate solution;

(d) reacting ammonium hydroxide with the lead acetate solution to form a lead hydroxide; and (e) dehydrating the lead hydroxide to produce lead monoxide.

Any lead dioxide in the lead bearing material may also be decomposed in step (b) of the process to produce lead monoxide. Alternatively, such lead dioxide may also be treated with acidic ammonium acetate in step (e) together with a reducing agent to simultaneously decompose the lead dioxide and form additional lead acetate.

In another embodiment of this invention, a continuous method for producing lead monoxide from a lead sulfate bearing material is provided wherein the by-products of reactions occurring in the above process are used to form the reagents used in the various steps of the process. More particularly, carbon dioxide formed as a by-product of the decomposition of lead carbonate in step (b) can be separated and combined with ammonia to produce the ammonium carbonate solution used in step (a). The normal ammonium acetate solution formed as a by-product of the reaction of impure lead monoxide and acidic ammonium acetate solution in step (e) can be distilled to separate an ammonium hydroxide distillate and an acidic ammonium acetate residue. The ammonium hydroxide distillate can be recycled for use in step (d) while the acid ammonium acetate can be used to produce soluble lead acetate in step (c).

FIG. 1 is a flow diagram of the continuous method of this invention.

The starting material for the process of this invention is a lead bearing material, particularly a lead sulfate bearing material such as battery mud. Such battery mud consists mainly of chemically reactive lead compounds, such as lead sulfate, minor amounts of lead dioxide, lead-antimony alloys and other complex lead bearing compounds. Such battery mud is produced by crushing a battery and separating the resulting mud from battery parts (grid metal and plastics) by conventional separation techniques well known in the art.

According to this invention the lead bearing material is slurried in water and then leached with an ammonium carbonate solution wherein the lead sulfate contained therein is converted to an insoluble lead carbonate and soluble ammonium sulfate according to the following reaction:

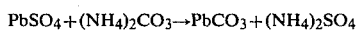

$$PbSO_4 + (NH_4)_2CO_3 \rightarrow PbCO_3 + (NH_4)_2SO_4$$

Unreacted materials such as lead dioxide remain undissolved in admixture with the insoluble lead carbonate in the ammonium sulfate solution.

Generally an aqueous solution of ammonium carbonate is employed containing from 1.5% to 12.5% ammonium carbonate and preferably about 6.5%. A lead battery mud containing from about 16 to 18 wt. % of sulfate anion can be employed in the first step. Such mud is slurried with water to form a heterogeneous dispersion containing from about 10% to 60% by weight of mud and preferably about 35% by weight. The mud slurry and ammonium carbonate solution are then combined, preferably in counter-current fashion at a mole ratio of ammonium carbonate to lead sulfate in the mud slurry of from 1:1 to 1.25 at temperatures of from 25° to 35° C., and preferably 30° C. Reaction time may vary from 1 minute to 60 minutes but generally all reactions are completed between 5 and 15 minutes.

After the reaction is substantially completed, the ammonium sulfate solution is separated from the lead carbonate and other insoluble materials. The isolated ammonium sulfate solution may then be crystallized to recover solid ammonium sulfate.

The lead carbonate and other insoluble material in the mud are next calcined or heated at temperatures sufficient to decompose the lead carbonate to lead monoxide and carbon dioxide according to the following reaction:

$$PbCO_3 \rightarrow PbO + CO_2$$

Generally the temperatures required to decompose the lead carbonate are from 400° to 650° C., and preferably 600° C. Preferably, the heating should be conducted in an inert atmosphere even though it may be conducted in a slightly oxidizing atmosphere. Heating is conducted for between about 15 and 90 minutes to convert substantially all the lead carbonate to lead monoxide. Most usually, however, all decomposition is completed within 60 minutes. The carbon dioxide evolved may be separated from the lead monoxide and reacted with ammonia to form ammonium carbonate which may in turn be used as the ammonium carbonate leach for desulfation of the battery mud. This will be discussed in more detail in connection with FIG. 1 depicting a continuous method of this invention.

Any lead dioxide contained in the insoluble residue after ammonium carbonate treatment may also be decomposed along with the lead carbonate to form additional lead monoxide and oxygen according to the following:

$$2PbO_2 \rightarrow 2PbO + O_2$$

The lead monoxide product in admixture with undecomposed lead dioxide or lead carbonate and other insoluble materials is next leached with acid ammonium acetate, $NH_4Ac \cdot HAc$ formed by reacting an acetic acid solution with normal ammonium acetate. During the acid ammonium acetate leach the lead monoxide reacts with the acid ammonium acetate to form soluble lead acetate and a basic lead acetate (depending on stoichiometry) and soluble ammonium acetate. While stoichiometric amounts of acid ammonium acetate to lead monoxide may be employed, mole ratios other than stoichiometric may be used.

$$PbO + 2NH_4Ac \cdot HAc \longrightarrow PbAc_2 + 2NH_4Ac + H_2O$$
(acid ammonium) acetate or $$2PbO + 2NH_4Ac \cdot HAc \longrightarrow PbAc_2 \cdot Pb(OH)_2 + 2NH_4Ac$$
(basic lead) acetate Any undecomposed lead carbonate is also converted to soluble lead acetate by the acid ammonium acetate during the reaction as follows:

$$PbCO_3 + 2NH_4Ac \cdot HAc \rightarrow PbAc_2 + 2NH_4Ac + H_2O + CO_2$$

Alternatively, to decompose and react undecomposed lead dioxide, a reducing agent such as hydrogen peroxide may be added along with the acid ammonium acetate solution to form lead acetate as follows:

$$PbO_2 + 2NH_4Ac \cdot HAc + H_2O_2 \rightarrow PbAc_2 + 2H_2O + O_2 + 2NH_4Ac$$

Generally, the acid ammonium acetate solution is combined with the products of calcination as a water slurry containing 10% to 25%, preferably 15% of calcined product. The concentration of lead in the calcined feed should be from 50% to 99% by weight and preferably from 75% to 85%. The solution is contacted with the slurry at temperatures of between 20° C. and 80° C. and preferably from 25° C. to 35° C. at pressures from ½ atm. to 1 atm. for between 5 and 60 minutes to complete all reactions.

The lead acetate solution formed by the reactions between the acid ammonium acetate and lead monoxide, undecomposed lead carbonate, if any, and lead dioxide, if any, plus reducing agent is separated from the insoluble residue containing minor amounts basic lead acetate and antimonial lead gangue. The insoluble residue is then sent to a smelter, if desired, to recover antimony-lead values.

A portion of the separated lead acetate solution may be used to prepare lead chemicals such as lead chromate, lead tungstate, lead molybdate, lead arsenate and the like by reaction with appropriate reagents.

However, in order to prepare pure lead monoxide from the lead acetate solution according to this invention, the lead acetate is next treated with ammonium hydroxide to precipitate a lead hydroxide having the formula $Pb(OH)_2$, and soluble ammonium acetate according to the following reaction:

$$PbAc_2 + 2NH_4OH \rightarrow Pb(OH)_2 + 2NH_4Ac$$

As shown in the above reaction, the stoichiometry requires at least 2 moles of ammonium hydroxide per mole of lead acetate. Generally, a 10 to 15 N ammonium hydroxide solution is used to precipitate lead hydroxide from a lead acetate solution containing 7% to 9% lead in the lead acetate solution. The relative amounts of ammonium hydroxide solution and lead acetate solution should be sufficient to provide a ratio of $NH_3$ contained in the ammonium hydroxide to HAc contained in the lead acetate solution of from about 2 to 14. The solutions are reacted at from 15° to 80° C., preferably from 25° to 30° C. for between 30 and 60 minutes at pressures of from 1 to 2 atmospheres.

The lead hydroxide precipitate is separated from the normal ammonium acetate solution and heated to from 145° to 180° C. to dehydrate the hydroxide and form substantially pure lead monoxide, PbO. The term substantially pure as used herein means the product contains less than 1.00% impurities, such as primary iron oxide and antimony oxide and preferably less than 0.1% impurities.

The normal ammonium acetate solution is optionally distilled to yield an ammonia/ammonium hydroxide distillate and an acid ammonium acetate residue. The ammonium hydroxide can be recycled to the lead hydroxide precipitation step and the acid ammonium acetate can be recycled to the lead monoxide leach step in a continuous method of this invention which will be discussed further below.

FIG. 1 shows a process flow diagram of one continuous method according to this invention wherein by-products of various reactions, such as carbon dioxide from lead carbonate calcination and ammonium hydroxide and acid ammonium acetate from ammonium acetate solution distillation are recycled or used to prepare reagents used in the process.

A battery mud feed 11 containing lead sulfate, lead dioxide and other materials is leached with ammonium carbonate solution 12. The products, comprising an ammonium carbonate solution and insoluble lead carbonate, as well as lead dioxide are separated at 13. The separated ammonium sulfate solution is then crystalized to recover solid ammonium sulfate therefrom at 14. The solid residues from the separation 13 are calcined at 15 to produce impure lead oxide, oxygen and carbon dioxide. The formed carbon dioxide is drawn off at 16 and combined with ammonia 17 in tank 18 to form an ammonium carbonate solution. The ammonium carbonate solution is then added to the battery mud through line 19 at 12 to leach incoming battery mud. A carbon dioxide source 20 is used for start-up and make-up purposes to produce ammonium carbonate solution.

After the calcination step 15, the impure lead monoxide and other impurities are subjected to an acid ammonium acetate leach at 21 to form a solution of lead acetate and an insoluble residue. The lead acetate solution is separated from the solids at 22. The solids, comprising an antimonial lead gangue is removed at 23 for smelting. The lead acetate solution is treated with ammonium hydroxide at 24 to precipitate lead hydroxide with the concurrent formation of an ammonium acetate solution. After separation of insoluble lead hydroxide from the solution at 25, the lead hydroxide is dehydrated by heating at 26 to form a pure PbO product at 27.

The ammonium acetate solution separated at 25 is optionally subjected to distillation at 28 to form an equilibrium mixture of ammonia and ammonium hydroxide solution as a distillate and an acid ammonium acetate as a residue. The residue can then be recycled to the acid ammonium acetate leach step via line 29 to leach incoming lead oxide at 21. Acetic acid solution 31, is used as make-up to form additional acid ammonium acetate solution.

The distillate is recycled to the ammonium hydroxide precipitation step at 24 via line 30. An ammonia source 32 is used for make-up purposes for the precipitation step.

The invention will be more fully described with reference to the following Examples. All percentages given are by weight unless otherwise indicated.

EXAMPLE I

Battery mud containing 71% lead, 18% sulfate anion, 21% lead dioxide and minor amounts of antimony, iron and silica was fed to a desulfation reactor (primary reactor) with recycled ammonium carbonate from a second desulfation reactor and reacted to form a slurry containing about 30 to 40% solids. The battery mud was then leached at about 20° to 30° C. for 30 minutes to convert 70 to 75% of the lead sulfate content to lead carbonate. The resulting slurry was thickened to a 66% solids level by removal of a supernatant solution containing 17% ammonium sulfate.

The solids slurry was reacted with a fresh 6.5% ammonium carbonate solution in counter-current fashion in a secondary desulfation reactor at a 4 to 5:1 mole ratio of ammonium carbonate to lead sulfate to yield a lead carbonate slurry. The slurry was concentrated to a 66% solids level. The resulting slurry was filtered and washed in a horizontal vacuum filter to form a 77% solids cake.

The filter cake was then calcined at 550° C. for about 1.5 hours in an inert or slightly oxidizing atmosphere to evaporate residual water and decompose the lead carbonate to lead monoxide and carbon dioxide. Fiber material associated with the battery mud was decomposed along with lead dioxide to lead monoxide.

The calcined, desulfated battery mud containing lead monoxide in admixture with other solid impurities was combined with a 8.0 to 9.1% solution of acid ammonium acetate to form a 14 to 15% solids slurry. The concentration of lead in the calcined feed was from about 75 to 90%. The mud was leached at 20° to 30° C. for 1 hour. The resulting 2 to 6% solids slurry was concentrated in a thickener and then filtered on a horizontal vacuum filter to form a 66% solids cake.

The overflow from the thickener is an 8 to 9% Pb-lead acetate solution which was fed to a precipitation reactor wherein concentrated ammonium hydroxide (29% $NH_3$) was added in amounts of approximately 14 to 15 times the stoichiometric amount. A resulting white precipitate of lead hydroxide and basic lead acetate formed. Within a few minutes the precipitate turned to the color green indicating formation of orthorhombic lead monoxide. The slurry was then filtered and washed with a dilute ammonia solution and the cake dried at 150° C. to form lead monoxide. The product had a total impurity concentration of around 1,000 ppm.

EXAMPLE II

The battery mud of Example I was desulfated according to Example I.

The desulfated battery mud containing lead monoxide, lead oxide, lead dioxide, and lead carbonate in admixture with other solid impurities was combined with a solution of acid ammonium acetate and a 30% hydrogen peroxide solution to form a 1:1 stoichiometric solution. The mud was leached at 20° to 30° C. for 1 hour. The resulting 2 to 6% solids slurry is concentrated in a thickener and filtered. The filtrate was returned to the thickener.

The overflow from the thickener, which was an 8 to 9% Pb lead acetate solution, was fed to the precipitation reactor wherein concentrated ammonium hydroxide (29% $NH_3$) was added in amounts of about 14 to 15 times the stoichiometric amount. A white precipitate formed of lead hydroxide and basic lead acetate. Within a few minutes the precipitate turned green indicating the formation of orthorhombic lead monoxide. The slurry was then filtered and washed with a dilute ammonia solution and dried at 150° C. to form lead monoxide. The product had a total impurity concentration of around 650 ppm.

The invention being thus described, it will be obvious that the same may be varied in many ways, such variations are not to be regarded as a departure from the spirit and scope of the invention, and all such modifications are intended to be included within the scope of the following claims.

What is claimed is:

1. A process for producing lead monoxide from solid lead sulfate bearing material which comprises:
   (a) reacting said material with an ammonium carbonate solution to convert said lead sulfate to lead carbonate;
   (b) decomposing the lead carbonate by heating at temperatures from about 400° to 650° C. to decompose substantially all of said lead carbonate to impure lead monoxide;
   (c) reacting the impure lead monoxide with an effective amount of acidic ammonium acetate solution to convert said lead monoxide to a lead acetate solution;
   (d) reacting the lead acetate solution with ammonium hydroxide to form lead hydroxide; and
   (e) dehydrating said lead hydroxide to produce lead monoxide.

2. The process of claim 1 wherein said ammonium carbonate solution contains from 1.5% to 12.5% by weight of ammonium carbonate.

3. The process of claim 1 wherein said lead sulfate bearing material contains lead dioxide and said lead dioxide is decomposed with said lead carbonate by reaction with acidic ammonium acetate and a reducing agent in step (b) to form lead acetate.

4. The process of claim 1 wherein said reaction of impure lead monoxide and acidic ammonium acetate in step (c) is carried out at temperatures of from about 20° to 80° C.

5. The process of claim 1 wherein the ratio of ammonia contained in said ammonium hydroxide to acetic acid in said lead acetate solution is from about 2 to 14.

6. The process of claim 1 wherein said ammonium hydroxide and said lead acetate solution in step (d) are reacted at from 15° to 80° C.

7. The process of claim 1 wherein said lead hydroxide is dehydrated by heating at from 145° to 180° C.

8. A process for producing substantially pure lead monoxide from solid lead sulfate bearing battery mud; which comprises:
   (a) reacting an aqueous dispersion of battery mud with an ammonium carbonate solution to form lead carbonate and an ammonium sulfate solution;
   (b) decomposing the lead carbonate by heating at temperatures from about 400° to 650° C. to decompose substantially all of said lead carbonate to impure lead monoxide;
   (c) reacting the impure lead monoxide with an effective amount of acidic ammonium acetate solution to convert said lead monoxide to a lead acetate solution;
   (d) reacting said impure lead monoxide with acidic ammonium acetate to form a soluble lead acetate solution and an insoluble residue;
   (e) separating said lead acetate solution from said insoluble residue;
   (f) adding ammonium hydroxide solution to said lead acetate solution to form insoluble lead hydroxide and ammonium acetate solution;
   (g) separating said lead hydroxide from said ammonium acetate solution; and
   (h) heating said lead hydroxide to form substantially pure lead monoxide.

9. The process of claim 8 wherein step (a) is conducted at between about 25° to 35° C.

10. The process of claim 8 wherein said reaction of impure lead monoxide and acidic ammonium acetate in step (c) is carried out at temperatures of from about 20° to 80° C.

11. The process of claim 8 wherein the ratio of ammonia contained in said ammonium hydroxide solution to acetic acid in said lead acetate solution is from about 2 to 14.

12. The process of claim 8 wherein said ammonium hydroxide and said lead acetate solution in step (f) are reacted at from 15° C. to 80° C.

13. The process of claim 8 wherein said ammonium acetate solution of step (g) is distilled to form a distillate consisting of ammonia and ammonium hydroxide solution and a residue of acid ammonium acetate; said acid ammonium acetate being used in step (d) and said ammonia and ammonium hydroxide being used in step (f).

* * * * *